US010773304B2

(12) United States Patent
Wiesner et al.

(10) Patent No.: US 10,773,304 B2
(45) Date of Patent: Sep. 15, 2020

(54) POWDER CIRCUIT FOR USE IN AN APPARATUS FOR PRODUCING THREE-DIMENSIONAL WORK PIECES

(71) Applicant: SLM Solutions Group AG, Luebeck (DE)

(72) Inventors: Andreas Wiesner, Luebeck (DE); Bodo Haack, Luebeck (DE); Dieter Schwarze, Luebeck (DE)

(73) Assignee: SLM Solutions Group AG, Lubeck (DE)

( * ) Notice: Subject to any disclaimer, the term of this patent is extended or adjusted under 35 U.S.C. 154(b) by 1142 days.

(21) Appl. No.: 14/948,710

(22) Filed: Nov. 23, 2015

(65) Prior Publication Data

US 2016/0144431 A1   May 26, 2016

(30) Foreign Application Priority Data

Nov. 24, 2014   (EP) ..................................... 14194511

(51) Int. Cl.
  *B22F 3/105*       (2006.01)
  *B29C 64/35*       (2017.01)
  (Continued)

(52) U.S. Cl.
  CPC ............ *B22F 3/1055* (2013.01); *B29C 64/35* (2017.08); *B22F 2003/1057* (2013.01);
  (Continued)

(58) Field of Classification Search
  CPC ........... B22F 3/1055; B22F 2003/1057; B29C 64/35; B29C 64/153; B33Y 10/00; B33Y 50/02; B33Y 30/00
  See application file for complete search history.

(56) References Cited

U.S. PATENT DOCUMENTS

2006/0214335 A1   9/2006   Cox

FOREIGN PATENT DOCUMENTS

DE           20107262 U1   10/2001
DE      102011088158 A1    6/2013
           (Continued)

OTHER PUBLICATIONS

Office Action, JP2015-226820, dated Sep. 20, 2016, with partial translation, 11 pages.
(Continued)

*Primary Examiner* — Thorl Chea
(74) *Attorney, Agent, or Firm* — Taft Stettinius & Hollister LLP

(57) ABSTRACT

A powder circuit (36) for use in an apparatus (10) for producing three-dimensional work pieces by irradiating layers of a raw material powder with electromagnetic or particle radiation comprises a process chamber (12) accommodating a carrier (16) and a powder application device (14) for applying a raw material powder onto the carrier (16), the process chamber (12) being provided with a powder inlet (30) for supplying raw material powder to the powder application device (14) and a powder outlet (32) for discharging excess raw material powder from the process chamber (12). The powder circuit (36) further comprises a powder circulation line (34) connecting the powder outlet (32) of the process chamber (12) to the powder inlet (30) of the process chamber (12) and a conveying device (38) arranged in the powder circulation line (34) for conveying the raw material powder through the powder circulation line (34). A sensor arrangement (42) is adapted to detect at least one of a parameter characteristic of a powder supply to the conveying device (38) and a parameter characteristic of a powder discharge from the conveying device (38). A control unit (40) adapted to control operation of the conveying
(Continued)

device (38) in dependence of at least one of the parameter characteristic of the powder supply to the conveying device (38) and the parameter characteristic of the powder discharge from the conveying device (38).

7 Claims, 1 Drawing Sheet

(51) Int. Cl.
    *B33Y 50/02*     (2015.01)
    *B33Y 30/00*     (2015.01)
    *B33Y 10/00*     (2015.01)
    *B29C 64/357*    (2017.01)
    *B29C 64/153*    (2017.01)

(52) U.S. Cl.
    CPC ............. *B29C 64/153* (2017.08); *B33Y 10/00* (2014.12); *B33Y 30/00* (2014.12); *B33Y 50/02* (2014.12)

(56) References Cited

FOREIGN PATENT DOCUMENTS

| | | |
|---|---|---|
| DE | 202013009787 U1 | 2/2014 |
| EP | 1316408 A1 | 6/2003 |
| EP | 1700686 A2 | 9/2006 |
| JP | H10122536 A | 5/1998 |
| JP | 2006248231 A | 9/2006 |

OTHER PUBLICATIONS

European Patent Office, Extended European Search Report issued in Application No. 14194511.3, dated May 13, 2015, 7 pp.

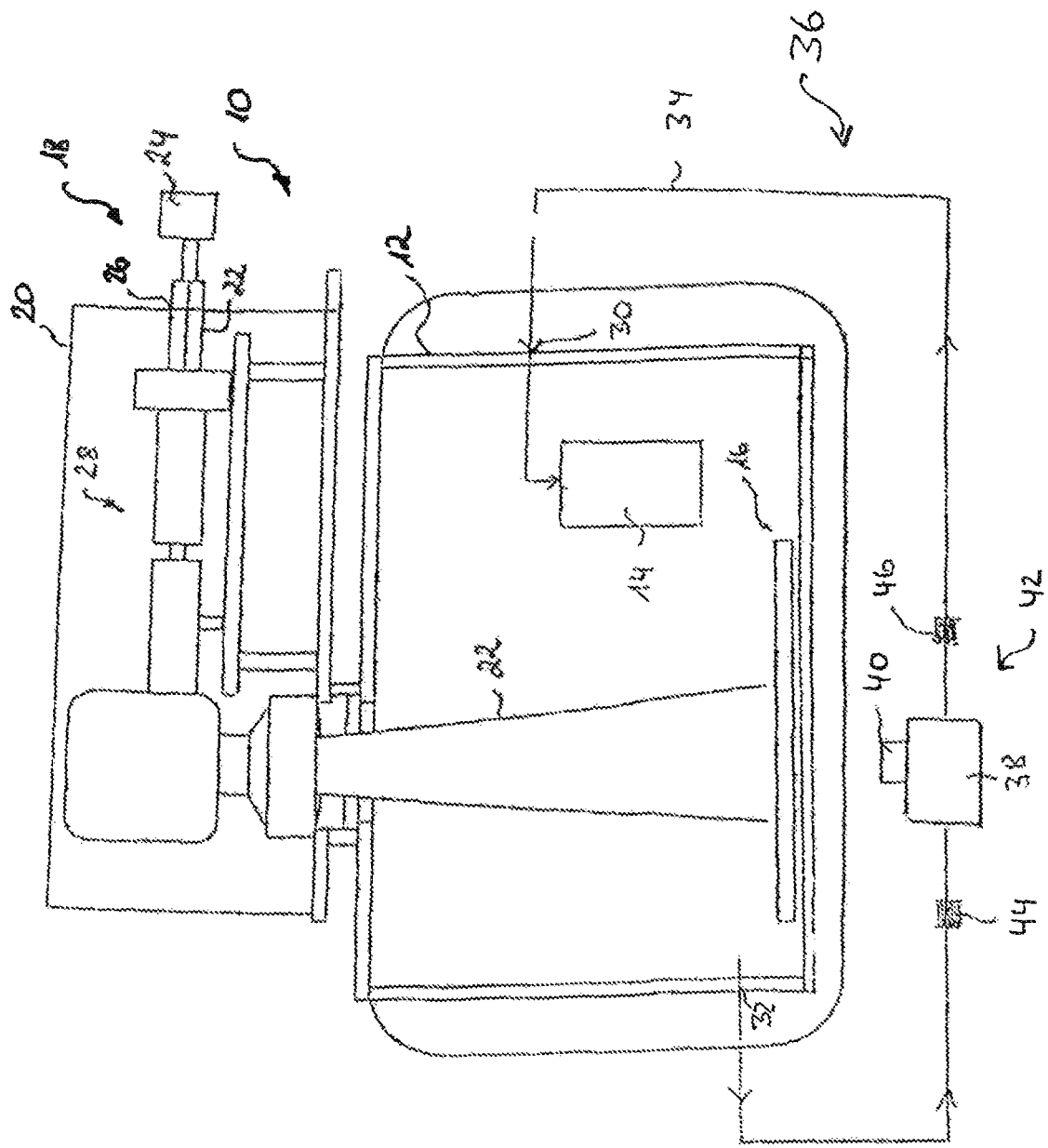

POWDER CIRCUIT FOR USE IN AN APPARATUS FOR PRODUCING THREE-DIMENSIONAL WORK PIECES

The present invention relates to a powder circuit for use in an apparatus for producing three-dimensional work pieces by irradiating layers of a raw material powder with electromagnetic or particle radiation. The invention further relates to a method of operating a powder circuit of this kind and to an apparatus for producing three-dimensional work pieces by irradiating layers of a raw material powder with electromagnetic or particle radiation which is equipped with a powder circuit of this kind.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production of prototypes, tools, replacement parts, high value components or medical prostheses, such as, for example, dental or orthopaedic prostheses, on the basis of CAD data.

An apparatus which is suitable for producing a larger number of moulded bodies from pulverulent raw materials by a powder bed fusion process is described in DE 20 2013 009 787 U1. The prior art apparatus is provided with a work piece generating section comprising an irradiation device and a process chamber. The process chamber may be sealed against the ambient atmosphere and accommodates a carrier for receiving a raw material powder as well as a work piece that is generated from the raw material powder on the carrier by an additive layering process. The carrier is displaceable relative to the process chamber into a building chamber in order to compensate for an increasing height of the work piece upon being generated. The building chamber may be sealed against the ambient atmosphere by means of a cover and thereafter may be transferred from an operating position adjacent to the process chamber into an exchange position outside of the work piece generating section. From the exchange position, the building chamber is further transferred to a post-treatment section. In the post-treatment section, the work piece accommodated within the building chamber is cooled and the work piece finally is removed from the building chamber. A powder recovery system of the apparatus serves to discharge excess raw material powder from the building chamber and the process chamber, to treat and process the discharged powder and to finally return the powder to the process chamber.

The invention is directed at the object of providing a powder circuit for use in an apparatus for producing three-dimensional work pieces by irradiating layers of a raw material powder with electromagnetic or particle radiation which can be operated in a reliable manner and with reduced maintenance efforts. The invention is further directed at the objects of providing a method of operating an apparatus of this kind and of providing an apparatus for producing three-dimensional work pieces by irradiating layers of a raw material powder with electromagnetic or particle radiation which is equipped with a powder circuit of this kind.

These objects are addressed by a powder circuit as defined in claim 1, a method as disclosed herein and an apparatus as disclosed herein.

A powder circuit for use in an apparatus for producing three-dimensional work pieces by irradiating layers of a raw material powder with electromagnetic or particle radiation comprises a process chamber accommodating a carrier and a powder application device for applying a raw material powder onto the carrier. Preferably, the process chamber is sealable against the ambient atmosphere, i.e. against the environment surrounding the process chamber, in order to be able to maintain a controlled atmosphere, in particular an inert atmosphere within the process chamber. In principle, the carrier may be a rigidly fixed carrier. Preferably, however, the carrier is designed to be displaceable in vertical direction so that, with increasing construction height of a work piece, as it is built up in layers from the raw material powder, the carrier can be moved downwards in the vertical direction. The raw material powder preferably is a metallic powder, in particular a metal alloy powder, but may also be a ceramic powder or a powder containing different materials. The powder may have any suitable particle size or particle size distribution. It is, however, preferable to process powders of particle sizes <100 µm.

The process chamber is provided with a powder inlet for supplying raw material powder to the powder application device and a powder outlet for discharging excess raw material powder from the process chamber. A powder circulation line connects the powder outlet of the process chamber to the powder inlet of the process chamber. Thus, via the powder circulation line, excess raw material powder which is removed from the process chamber during or after a work piece building process can be recirculated into the process chamber, i.e. to the powder application device, and can hence be reused for building up a work piece to be generated.

A conveying device is arranged in the powder circulation line for conveying the raw material powder through the powder circulation line. The conveying device may, for example, be designed in the form of a screw conveyor comprising a screw or spindle which is rotatably supported in a housing. It is, however, also conceivable to equip the powder circuit with another suitable conveying device. Beside the conveying device, devices and systems for treating, processing and storing the excess powder discharged from the process chamber before it is recirculated to the process chamber may be arranged in the powder circulation line. For example, sieves for separating coarse particles from the raw material powder or storage containers acting as buffers in order to ensure proper operation of the powder circuit also in case of high raw material powder demand in the process chamber may be present in the powder circulation line.

A sensor arrangement of the powder circuit is adapted to detect at least one of a parameter characteristic of a powder supply to the conveying device and a parameter characteristic of a powder discharge from the conveying device. Basically, the sensor arrangement may be adapted to detect only one of the parameter characteristic of the powder supply to the conveying device and the parameter characteristic of the powder discharge from the conveying device. Preferably, however, the sensor arrangement is configured to detect both, the parameter characteristic of the powder supply to the conveying device and the parameter characteristic of the powder discharge from the conveying device.

Finally, the powder circuit comprises a control unit which is adapted to control operation of the conveying device. In particular, the control unit, which may, for example, be designed in the form of an electronic control unit, is adapted to control the operation of the conveying device in dependence of at least one of the parameter characteristic of the powder supply to the conveying device and the parameter characteristic of the powder discharge from the conveying device. In an embodiment of the powder circuit, the control unit may be adapted to control the operation of the conveying device in dependence of only one of the parameter characteristic of the powder supply to the conveying device and the parameter characteristic of the powder discharge from the conveying device. Preferably, however, the control unit is configured to control the operation of the conveying device in dependence of both, the parameter characteristic of the powder supply to the conveying device and the parameter characteristic of the powder discharge from the conveying device.

By taking into account at least one of the actual supply of powder to the conveying device and the actual discharge of powder from the conveying device upon controlling the operation of the conveying device the operating parameters of the conveying device can be adjusted to the amount of powder present in the powder circulation line upstream and downstream of the conveying device, wherein the terms "upstream" and "downstream" in the context of this application refer to a direction of flow of the powder through the powder circulation line. In other words, in the powder circuit, the operating parameters of the conveying device can be adjusted to the powder load in the powder circulation line. Thus, the risk of damaging the conveying device during operation can be reduced. As a result, the powder circuit distinguishes by a particularly high operational reliability. Furthermore, maintenance efforts for repairing damages occurring on the conveying device or for replacing the conveying device can be reduced.

In a preferred embodiment of the powder circuit, the control unit is adapted to stop the operation of the conveying device in case at least one of the parameter characteristic of the powder supply to the conveying device and the parameter characteristic of the powder discharge from the conveying device is outside a predetermined range. The predetermined range for the parameter characteristic of the powder supply to the conveying device and the parameter characteristic of the powder discharge from the conveying device maybe stored, for example, in a storing unit of the control unit and may, for example, be selected based on the specification of the conveying device. By stopping the operation of the conveying device in case at least one of the parameters monitored by means of the sensor arrangement is outside a predetermined range, damages of the conveying device caused by a powder overload or a lack of powder in the powder circulation line can reliably be prevented.

The control unit may in particular be adapted to stop the operation of the conveying device in case the parameter characteristic of the powder supply to the conveying device indicates that a powder level in the powder circulation line upstream of the conveying device is below a predetermined threshold value. In case the control unit is adapted to employ a control strategy of this kind, it can be ensured that operation of the conveying device in an idle state, i.e. operation of the conveying device without a sufficient amount of powder being present within the conveying device, which may cause severe damages to the conveying device, in particular a screw or spindle of a conveying device designed in the form of a screw conveyor, is prevented.

Alternatively or additionally thereto, the control unit may be adapted to stop the operation of the conveying device in case the parameter characteristic of the powder discharge from the conveying device indicates that a powder level in the powder circulation line downstream of the conveying device is above a predetermined threshold value. A powder level in the powder circulation line downstream of the conveying device which exceeds the predetermined threshold value may, for example, be caused by a blockage of the powder circulation line or another component such as, for example, a sieve or a storage container which is arranged in the powder circulation line downstream of the conveying device. In case the control unit is adapted to stop the conveying device if it is detected that the powder level in the powder circulation line downstream of the conveying device is too high, damages of the conveying device occurring when the conveying device continues to convey powder against a powder clogging present downstream of the conveying device can be prevented. In particular, jamming and hence destruction of a screw or spindle of a conveying device designed in the form of a screw conveyor, which may occur when operation of the screw or spindle continues although the powder circulation line downstream of the conveying device is blocked, can be avoided.

The sensor arrangement may comprise a first sensor disposed in the powder circulation line upstream of the conveying device for detecting the parameter characteristic of the powder supply to the conveying device. The first sensor may, for example, be adapted to detect at least one of a powder level in the powder circulation line upstream of the conveying device and a volume flow of powder through the powder circulation line upstream of the conveying device.

Alternatively or additionally thereto, the sensor arrangement may comprise a second sensor disposed in the powder circulation line downstream of the conveying device for detecting the parameter characteristic of the powder discharge from the conveying device. Like the first sensor, also the second sensor may be adapted to detect at least one of a powder level in the powder circulation line downstream of the conveying device and a volume flow of powder through the powder circulation line downstream of the conveying device.

In a method of operating a powder circuit for use in an apparatus for producing three-dimensional work pieces by irradiating layers of raw material powder with electromagnetic or particle radiation, excess raw material powder is discharged from a process chamber accommodating a carrier and a powder application device for applying the raw material powder onto the carrier through the powder outlet of the process chamber. The raw material powder discharged from the process chamber is recirculated to the process chamber through a powder inlet of the process chamber for supplying raw material powder to the powder application device via a powder circulation line. The raw material powder is conveyed through the powder circulation line by means of a conveying device arranged in the powder circulation line. At least one of a parameter characteristic of a powder supply to the conveying device and a parameter characteristic of a powder discharge from the conveying device is detected. Operation of the conveying device is controlled in dependence of at least one of the parameter characteristic of the powder supply to the conveying device and the parameter characteristic of the powder discharge from the conveying device.

The operation of the conveying device may be stopped in case at least one of the parameter characteristic of the powder supply to the conveying device and the parameter characteristic of the powder discharge from the conveying device is outside a predetermined range.

In particular, the operation of the conveying device may be stopped in case the parameter characteristic of the powder supply to the conveying device indicates that a powder level in the powder circulation line upstream of the conveying device is below a predetermined threshold value.

Alternatively or additionally thereto, the operation of the conveying device may be stopped in case of the parameter characteristic of the powder discharge from the conveying device indicates that a powder level in the powder circulation line downstream of the conveying device is above a predetermined threshold value.

The parameter characteristic of the powder supply to the conveying device may be detected by means of a first sensor disposed in the powder circulation line upstream of the conveying device.

Alternatively or additionally thereto, the parameter characteristic of the powder discharge from the conveying device may be detected by a second sensor disposed in the powder circulation line downstream of the conveying device.

An apparatus for producing three-dimensional work pieces by irradiating layers of a raw material powder with electromagnetic or particle radiation comprises an irradiation device. The irradiation device may comprise at least one radiation source, in particular a laser source, and at least one optical unit for guiding and/or processing a radiation beam emitted by the radiation source. The optical unit may comprise optical elements such an object lens, in particular an f-theta lens, and a scanner unit, the scanner unit preferably comprising a diffractive optical element and a deflection mirror. Further, the apparatus comprises an above described powder circuit.

Preferred embodiments of the invention in the following are explained in greater detail with reference to the accompanying schematic drawing, in which:

FIG. 1 shows an apparatus for producing three-dimensional work pieces by irradiating layers of a raw material powder with electromagnetic or particle radiation.

FIG. 1 shows an apparatus 10 for manufacturing a component by an additive layer construction method. The apparatus 10 comprises a process chamber 12. A powder application device 14, which is disposed in the process chamber 12, serves to apply a raw material powder onto a carrier 16. The process chamber 12 is sealable against the ambient atmosphere, i.e. against the environment surrounding the process chamber 12. The carrier 16 is designed to be displaceable in a vertical direction so that, with increasing construction height of a component, as it is built up in layers from the raw material powder on the carrier 16, the carrier 16 can be moved downwards in the vertical direction.

The apparatus 10 further comprises an irradiation device 18 for selectively irradiating laser radiation onto the raw material powder applied onto the carrier 16. By means of the irradiation device 18, the raw material powder applied onto the carrier 16 may be subjected to laser radiation in a site-selective manner in dependence on the desired geometry of the component that is to be produced. The irradiation device 18 has a hermetically sealable housing 20. A radiation beam 22, in particular a laser beam, provided by a radiation source 24, in particular a laser source which may, for example, comprise a diode pumped Ytterbium fibre laser emitting laser light at a wavelength of approximately 1070 to 1080 nm is directed into the housing 20 via an opening 26.

The irradiation device 18 further comprises an optical unit 28 for guiding and processing the radiation beam 22. The optical unit 28 may comprise a beam expander for expanding the radiation beam 22, a scanner and an object lens. Alternatively, the optical unit 28 may comprise a beam expander including a focusing optic and a scanner unit. By means of the scanner unit, the position of the focus of the radiation beam 22 both in the direction of the beam path and in a plane perpendicular to the beam path can be changed and adapted. The scanner unit may be designed in the form of a galvanometer scanner and the object lens may be an f-theta object lens.

During operation of the apparatus 10, a first layer of a component to be produced is generated on the carrier 16 by selectively irradiating the raw material powder layer applied onto the carrier 16 with the radiation beam 22. The radiation beam 22 is directed over the raw material powder layer applied onto the carrier 16 in accordance with CAD data of the component to be produced. After the first layer of the component to be produced is completed, the carrier 16 is lowered in a vertical direction allowing the application of a successive powder layer by means of the powder application device 14. Thereafter, the successive powder layer is irradiated by means of the irradiation device 18. Thus, layer by layer, the component is built up on the carrier 16.

The process chamber 12 is provided with a powder inlet 30 for supplying raw material powder to the process chamber 12 and further to the powder application device 14. Excess raw material powder is discharged from the process chamber 12 via a powder outlet 32. The powder outlet 32 of the process chamber 12 is connected to the powder inlet 30 of the process chamber 12 via a powder circulation line 34. Thus, excess raw material powder which is discharged from the process chamber 12 via the powder outlet 32 may be recirculated to the powder inlet 30 of the process chamber 12 and reused in the powder application device 14. The process chamber 12 and the powder circulation line 34 thus can be considered as components of a powder circuit of the apparatus 10 which in FIG. 1 is designated with the reference numeral 36.

The powder circuit 36 further comprises a conveying device 38 which is arranged in the powder circulation line 34 and which serves to convey the raw material powder which is discharged from the process chamber 12 via the powder outlet 32 through the powder circulation line 34 and finally back to the powder inlet 30 of the process chamber 12. In the embodiment of an apparatus 10 shown in the drawings, the conveying device 38 is designed in the form of a screw conveyor and thus comprises a screw or spindle which is rotatably received within a housing and upon rotating around an axis within the housing conveys raw material powder through the powder circulation line 34. Besides the conveying device 38, further systems and devices (not shown in the drawing) for treating, processing and storing the raw material powder before being recirculated to the process chamber 12 such as, for example, sieve arrangements or storage containers may be disposed in the powder circulation line 34.

Operation of the conveying device 38 is controlled by means of a control unit 40. The control unit 40, which may be designed in the form of electronic control unit, may be a control unit which is exclusively associated with the conveying device 38, i.e. a control unit which exclusively serves to control operation of the conveying device 38. It is, however, also conceivable that the control unit 40 is defined by or incorporated into a superimposed control unit of the apparatus 10.

The powder circuit 36 further comprises a sensor arrangement 42. The sensor arrangement 42 is adapted to detect at least one of a parameter characteristic of a powder supply to the conveying device 38 and a parameter characteristic of a powder discharge from the conveying device 38. In particular, the sensor arrangement 42 comprises a first sensor 44 which is disposed in the powder circulation line 34 upstream of the conveying device 38 and which serves to detect the parameter characteristic of the powder supply to the conveying device 38. A second sensor 46 of the sensor arrangement 42 is arranged in the powder circulation line 34 downstream of the conveying device 38 and serves to detect the parameter characteristic of the powder discharge from the conveying device 38.

The detection results of the sensors 44, 46 are transferred to the control unit 40. As a result, the control unit 40 is able to control the operation of the conveying device 38 in dependence of at least one of the parameter characteristic of the powder supply to the conveying device 38 and the parameter characteristic of the powder discharge from the conveying device 38. Specifically, the control unit 40 stops the operation of the conveying device 38 in case at least one of the parameter characteristic of the powder supply to the conveying device 38 and the parameter characteristic of the powder discharge from the conveying device 38 is outside a predetermined range, wherein the predetermined parameter range(s) are stored in a storage unit of the control unit 40.

In the specific embodiment of a powder circuit 36 shown in the drawing, the first sensor 44 is adapted to detect a powder level in the powder circulation line 34 upstream of the conveying device 38. The parameter characteristic of the powder supply to the conveying device 38 which is detected by means of the first sensor 44 thus is indicative of the powder level in the powder circulation line 34 upstream of the conveying device 38 and in particular indicative of an operational state of the powder circuit 36 wherein a section of the powder circulation line 34 upstream of the conveying device 38 is not supplied with a sufficient amount of powder, for example due to a lack of powder in a storage container arranged in the powder circulation line 34 upstream of the conveying device 38 or due to a reduced discharge of powder from the process chamber 12.

In case the parameter characteristic of the powder supply to the conveying device 38 which is provided by the first sensor 44 indicates that the powder level in the powder circulation line 34 is below a predetermined threshold value, which may be stored in a storage unit of the control unit 40, the control unit 40 stops the operation of the conveying device 38. As a result, operation of the conveying device 38 in an idle state which may lead to severe damages of the conveying device 38 and in particular the screw or spindle of a conveying device 38 designed in the form of a screw conveyor can reliably be avoided.

The second sensor 46 is adapted to detect a powder level in the powder circulation line 34 downstream of the conveying device 38. The parameter characteristic of the powder discharge from the conveying device 38 which is detected by means of the second sensor 46 thus is indicative of the powder level in the powder circulation line 34 downstream of the conveying device 38 and in particular indicative of an operational state of the powder circuit 36 wherein a section of the powder circulation line 34 downstream of the conveying device 38 is loaded with an excess amount of powder, for example due to a blockage of the powder circulation line 34 downstream of the conveying device 38 or a blockage of device arranged in the powder circulation line 34 downstream of the conveying device 38.

In case the parameter characteristic of the powder supply to the conveying device 38 which is provided by the second sensor 46 indicates that the powder level in the powder circulation line 34 is above a predetermined threshold value, which may be stored in a storage unit of the control unit 40, the control unit 40 stops the operation of the conveying device 38. As a result, operation of the conveying device 38 against a powder clogging present in the powder circulation line 34 downstream of the conveying device 38 or in a device arranged in the powder circulation line 34 downstream of the conveying device 38 and hence jamming and destruction of the screw or spindle of the conveying device 38 designed in the form of a screw conveyor can be avoided.

The invention claimed is:

1. A powder circuit for use in an apparatus for producing three-dimensional work pieces by irradiating layers of a raw material powder with electromagnetic or particle radiation, the powder circuit comprising:
    a process chamber accommodating a carrier and a powder application device for applying a raw material powder onto the carrier, the process chamber being provided with a powder inlet for supplying raw material powder to the powder application device and a powder outlet for discharging excess raw material powder from the process chamber,
    a powder circulation line connecting the powder outlet of the process chamber to the powder inlet of the process chamber,
    a conveying device arranged in the powder circulation line for conveying the raw material powder through the powder circulation line,
    a sensor arrangement adapted to detect at least one of a parameter characteristic of a powder supply to the conveying device and a parameter characteristic of a powder discharge from the conveying device, wherein the parameter characteristic of the powder supply to the conveying device corresponds to at least one of a powder level in the powder circulation line upstream of the conveying device and a volume flow of powder through the powder circulation line upstream of the conveying device, and wherein the parameter characteristic of the powder discharge from the conveying device corresponds to at least one of a powder level in the powder circulation line downstream of the conveying device and a volume flow of powder through the powder circulation line downstream of the conveying device, and
    a control unit adapted to control operation of the conveying device in dependence on at least one of the parameter characteristic of the powder supply to the conveying device and the parameter characteristic of the powder discharge from the conveying device.

2. The powder circuit according to claim 1, wherein the control unit is adapted to stop the operation of the conveying device in case at least one of the parameter characteristic of the powder supply to the conveying device and the parameter characteristic of the powder discharge from the conveying device is outside a predetermined range.

3. The powder circuit according to claim 1, wherein the control unit is adapted to stop the operation of the conveying device in case at least one of the parameter characteristic of the powder supply to the conveying device and the parameter characteristic of the powder discharge from the conveying device is outside a predetermined range.

4. The powder circuit according to claim 1, wherein the control unit is adapted to stop the operation of the conveying device in case the parameter characteristic of the powder discharge from the conveying device indicates that a powder level in the powder circulation line downstream of the conveying device is above a predetermined threshold value.

5. The powder circuit according to claim 1, wherein the sensor arrangement comprises a first sensor disposed in the powder circulation line upstream of the conveying device for detecting the parameter characteristic of the powder supply to the conveying device.

6. The powder circuit according to claim 1, wherein the sensor arrangement comprises a second sensor disposed in the powder circulation line downstream of the conveying device for detecting the parameter characteristic of the powder discharge from the conveying device.

7. The powder circuit according to claim 1, wherein the sensor arrangement comprises:
- a first sensor disposed in the powder circulation line upstream of the conveying device for detecting the parameter characteristic of the powder supply to the conveying device; and
- a second sensor disposed in the powder circulation line downstream of the conveying device for detecting the parameter characteristic of the powder discharge from the conveying device.

* * * * *